United States Patent
Zhao (10) Patent No.: US 10,432,488 B2
(45) Date of Patent: Oct. 1, 2019

(54) METHOD AND APPARATUS FOR PROCESSING NETWORK ELEMENT STATE

(71) Applicant: Huawei Technologies Co., Ltd., Shenzhen, Guangdong (CN)

(72) Inventor: Dong Zhao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 156 days.

(21) Appl. No.: 14/335,297

(22) Filed: Jul. 18, 2014

(65) Prior Publication Data

US 2014/0364114 A1    Dec. 11, 2014

Related U.S. Application Data

(63) Continuation of application No. PCT/CN2013/070596, filed on Jan. 17, 2013.

(30) Foreign Application Priority Data

Jan. 20, 2012  (CN) .......................... 2012 1 0019190

(51) Int. Cl.
*H04W 52/02*  (2009.01)
*H04L 12/26*  (2006.01)
*H04L 12/24*  (2006.01)

(52) U.S. Cl.
CPC ...... *H04L 43/0817* (2013.01); *H04L 41/0869* (2013.01); *H04W 52/0206* (2013.01); *Y02D 70/00* (2018.01)

(58) Field of Classification Search
None
See application file for complete search history.

(56) References Cited

U.S. PATENT DOCUMENTS

2008/0207196 A1* 8/2008 Pettersson ............. H04W 24/00 455/424
2009/0325625 A1  12/2009 Hugl et al.
(Continued)

FOREIGN PATENT DOCUMENTS

CN    101873680 A    10/2010
CN    102045819 A     5/2011
(Continued)

OTHER PUBLICATIONS

3GPP TS 32.551 V10.1.0 (Mar. 2011), pp. 9, 12, 13, 15, 17, and 18.*
(Continued)

*Primary Examiner* — German Viana Di Prisco
(74) *Attorney, Agent, or Firm* — Slater Matsil, LLP (57) ABSTRACT

Embodiments of the present invention disclose a method and an apparatus for processing a network element state. The method includes: obtaining a network element by monitoring network element performance data or an accepted operation request, where the network element is a base station or a cell or a subnet; then obtaining target data corresponding to the network element, where the target data includes at least one of trace data, manual minimization of drive tests data, radio link failure data, a user equipment error report, alarm data, and performance data; subsequently, according to the target data, determining whether the network element is out of service or needs to compensate another network element; and finally, when the network element is out of service or needs to compensate another network element, indicating whether the network element can enter an energy saving state. The present invention is applicable to the field of communications systems.

12 Claims, 2 Drawing Sheets

(56) References Cited

U.S. PATENT DOCUMENTS

| | | | |
|---|---|---|---|
| 2011/0287756 A1* | 11/2011 | Cho | H04W 52/0229 455/418 |
| 2011/0319030 A1 | 12/2011 | Kondo et al. | |
| 2012/0208598 A1 | 8/2012 | Xia | |
| 2013/0053024 A1 | 2/2013 | Zou et al. | |
| 2013/0058269 A1 | 3/2013 | Xia et al. | |
| 2013/0095842 A1 | 4/2013 | Jia et al. | |
| 2013/0130670 A1* | 5/2013 | Samdanis | H04W 24/02 455/418 |
| 2013/0286917 A1 | 10/2013 | Jia et al. | |
| 2014/0051419 A1* | 2/2014 | Brend | H04W 52/0206 455/418 |
| 2014/0051446 A1* | 2/2014 | Rose | H04W 36/165 455/436 |
| 2014/0364114 A1 | 12/2014 | Zhao | |

FOREIGN PATENT DOCUMENTS

| | | | |
|---|---|---|---|
| CN | 102065448 A | 5/2011 | |
| CN | 102083145 A | 6/2011 | |
| CN | 102083192 A | 6/2011 | |
| CN | 102238595 A | 11/2011 | |
| CN | 102244879 A | 11/2011 | |
| CN | 102316512 A | 1/2012 | |
| CN | 103220695 B | 4/2017 | |
| EP | 2 544 485 A1 | 1/2013 | |
| JP | 2010-166474 A | 7/2010 | |
| JP | 2013-526192 A | 6/2013 | |
| WO | WO 2010/100820 A1 | 9/2010 | |
| WO | WO 2011047599 A1 * | 4/2011 | H04W 52/0206 |
| WO | WO 2011/134401 A1 | 11/2011 | |
| WO | WO 2011/134419 A1 | 11/2011 | |

OTHER PUBLICATIONS

3GPP TR 32.826 V1.0.0 (Dec. 2009), p. 15.*

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)", 3GPP TS 32.522 v11.1.0, Dec. 2011, 32 pages.

3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11), 3GPP TS 32.762 v11.0.0, Dec. 2011, 56 pages.

"Update of MDT Open Issues", Huawei, 3GPP TSG RAN WG3 #70bis, Jan. 17-21, 2011, 4 pages, R3-110154.

"Compensation mode energy saving", ZTE, 3GPP TSG RAN WG3 #74, Nov. 14-18, 2011, 5 pages, RE-112907.

"Energy saving solutions for inter-eNB scenario 2", Alcatel-Lucent Shanghai Bell, 3GPP TSG RAN WG3 #74, Nov. 14-18, 2011, 6 pages, R3-112974.

"Compensation mode energy saving," Agenda item: 13.2, Source: ZTE, Document for: Discussion and Approval, 3GPP TSG RAN WG3 #74, R3-112907, San Francisco, USA, Nov. 14-18, 2011, 4 pages.

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 10)," 3GPP TS 32.522 V10.3.0, Dec. 2011, 32 pages.

* cited by examiner

METHOD AND APPARATUS FOR PROCESSING NETWORK ELEMENT STATE

CROSS-REFERENCE TO RELATED APPLICATIONS

This application is a continuation of International Application No. PCT/CN2013/070596, filed on Jan. 17, 2013, which claims priority to Chinese Patent Application No. 201210019190.2, filed on Jan. 20, 2012, both of which are hereby incorporated by reference in their entireties.

TECHNICAL FIELD

The present invention relates to the field of communications systems, and in particular, to a method and an apparatus for processing a network element state.

BACKGROUND

An SON (self organizing network) is a type of key standardization project work of the 3GPP (the 3rd Generation Partnership Project) standards organization during R8/9/10 working periods, and a core concept thereof is to reduce traditional manual operations through an automation process during phases of network planning, deployment, optimization, and maintenance, so as to reduce a maintenance cost of a network operator.

A communications network element has an abnormal working state, where the network element may be a cell or a base station. In this state, the network element cannot provide normal communication services, and a user equipment (UE) residing in the network element cannot establish a communication connection, or a user equipment that is performing communication cannot maintain a communication connection and becomes offline. In addition, the network element is in this abnormal working state due to occurrence of a certain type of serious fault rather than execution of an energy saving operation of the network element. The network element under this situation is referred to as an out-of-service network element. A system needs a capability of automatically detecting the out-of-service network element, to trigger a restoring operation of the out-of-service network element or a deactivation operation of an energy saving network element in real time, so that the network element returns to a normal working state. The process of automatically detecting the out-of-service network element belongs to a scope of self healing (SH) of the self organizing network.

If a network element (a cell or a base station) is out of service, some KPIs of the network element, for example, indicators such as a quantity of access requests, a quantity of served users, and an access success rate, are similar to indicators when the cell meets normal energy saving conditions, and whether a current network element is out of service or can enter an energy saving state needs to be distinguished. Currently, methods for detecting the out-of-service network element place emphasis on implementation inside the base station. Whether a network element is out of service is determined by circularly detecting particular software and hardware inside the base station, an external power supply system, or a network connection, and an alarm that the network element is out of service is reported by the base station. This method is strongly related to implementation of the base station, and is only limited to the base station itself. Another detecting method is that, a network management system periodically collects a KPI (key performance indicator) and/or PM (performance measurement) of the network element, and if a performance indicator such as a RRC (radio resource control) connection establishment success rate, or a session or call drop rate (which may be briefly referred to as a "session/call drop rate" in the following) of the network element exceeds a preset threshold in one or more reporting periods, the network element is believed to be out of service. However, these methods only consider the base station itself, and possibly make the network element be in an out-of-service state for a long time, thereby further prolonging time for determining the out-of-service network element or increasing a probability of determining the out-of-service network element wrongly.

Therefore, due to defects of the above out-of-service determining methods, and that energy saving and out of service are not coordinated and controlled in the prior art, an out-of-service network element may decide by itself to enter an energy saving state after reaching an energy saving condition and become a "normally energy saving" cell; as a result, out-of-service detection and compensation are no longer performed for the network element, thereby causing a serious service fault.

SUMMARY

Embodiments of the present invention provide a method and an apparatus for processing a device state, which solve a problem in the prior art that time for determining an out-of-service network element is long and a probability of determining the out-of-service network element wrongly is high when the out-of-service network element is determined.

The embodiments of the present invention use the following technical solutions.

A method for processing a network element state includes:

determining whether a network element is out of service, or whether the network element is a compensation network element of another network element, or whether the network element is performing an optimization operation; and prohibiting, when the network element is out of service, or the network element is the compensation network element of another network element, or the network element is performing the optimization operation, the network element from entering an energy saving state.

An apparatus for processing a network element state includes:

a determining unit, configured to determine whether a network element is out of service, or whether the network element is a compensation network element of another network element, or whether the network element is performing an optimization operation; and an instructing unit, configured to instruct, when the determining unit determines that the network element is out of service, or the network element is the compensation network element of another network element, or the network element is performing the optimization operation, the network element not to enter an energy saving state.

In the prior art, only a base station itself is considered when a network element state is determined, which causes a problem of prolonging time for determining an out-of-service network element or increasing a probability of determining an out-of-service network element wrongly. In the method and apparatus for processing a network element state that are provided in the embodiments of the present invention, an out-of-service network element or a compensation network element of another network element or a network element that is performing an optimization operation is controlled, by determining whether the network element is out of service, or whether the network element is the compensation network element of another network element, or whether the network element is performing the optimization operation, not to enter an energy saving state, thereby solving the problem of prolonging the time for determining the out-of-service network element or increasing the probability of determining the out-of-service network element wrongly.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention more comprehensible, the following describes the present invention in detail with reference to the accompanying drawings and the embodiments.

Embodiment 1

Figure 1:
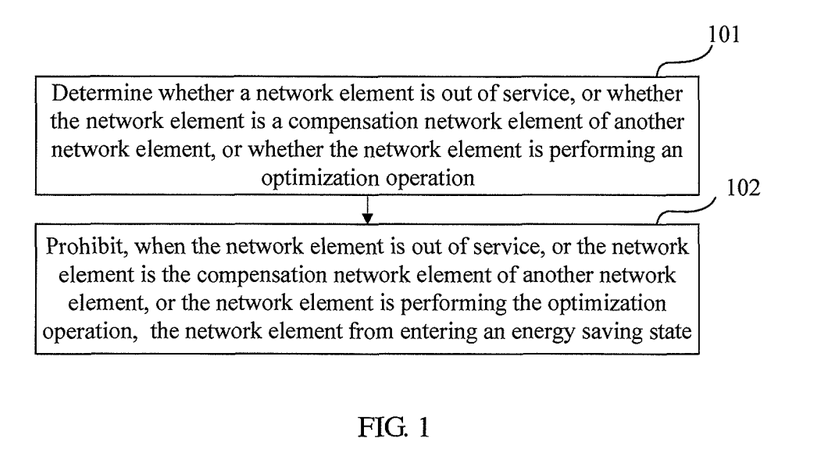
FIG. 1 is a flowchart of a method for processing a network element state according to Embodiment 1 of the present invention.

This embodiment provides a method for processing a network element state. As shown in FIG. 1, the method includes:

101: Determine whether a network element is out of service, or whether the network element is a compensation network element of another network element, or whether the network element is performing an optimization operation.

The network element may be a base station, a cell, or a subnet.

102: Prohibit, when the network element is out of service, or the network element is the compensation network element of another network element, or the network element is performing the optimization operation, the network element from entering an energy saving state.

Specifically, an energy saving allowing flag may be used to indicate whether the network element can enter the energy saving state.

The allowing flag is allowing or prohibiting. For example, the following form may be used: ES Allow=True indicates that the network element can enter the energy saving (ES) state, and ES Allow=False indicates that the network element is prohibited from entering the energy saving state, where ES Allow means energy saving is allowed, True means true, and False means false.

The energy saving allowing flag of the network element may be set for energy saving function control, used as an identifier set for controlling, by a distributed energy saving function, energy saving of the network element or for prohibiting a centralized energy saving function from controlling energy saving of the network element.

Further, when the network element is a cell, the flag may be used as an attribute of the cell; and when the network element is a base station, the flag may be used as an attribute of the base station.

Figure 2:
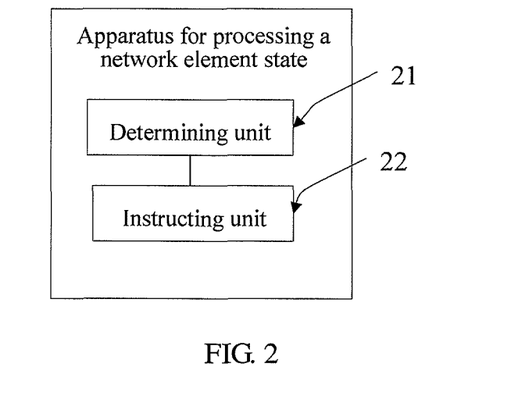
FIG. 2 is a schematic structural diagram of an apparatus for processing a network element state according to Embodiment 1 of the present invention.

This embodiment provides an apparatus for processing a network element state. As shown in FIG. 2, an entity of the apparatus may be a base station or a cell. The apparatus includes a determining unit 21 and an instructing unit 22.

The determining unit 21 is configured to determine whether a network element is out of service, or whether the network element is a compensation network element of another network element, or whether the network element is performing an optimization operation.

The instructing unit 22 is configured to prohibit, when the determining unit determines that the network element is out of service, or the network element is the compensation network element of another network element, or the network element is performing the optimization operation, the network element from entering an energy saving state.

Specifically, an energy saving allowing flag may be used to indicate whether the network element can enter the energy saving state.

The energy saving allowing flag of the network element may be set for energy saving function control, used as an identifier set for controlling, by a distributed energy saving function, energy saving of the network element or for prohibiting a centralized energy saving function from controlling energy saving of the network element.

The allowing flag is allowing or prohibiting. For example, the following form may be used: ES Allow=True indicates that the network element can enter the energy saving (ES) state, and ES Allow=False indicates that the network element is prohibited from entering the energy saving state, where ES Allow means energy saving is allowed, True means true, and False means false.

Further, when the network element is a cell, the flag may be used as an attribute of the cell; and when the network element is a base station, the flag may be used as an attribute of the base station.

In the prior art, only a base station itself is considered when a network element state is determined, which causes a problem of prolonging time for determining an out-of-service network element or increasing a probability of determining an out-of-service network element wrongly. In the method and apparatus for processing a network element state that are provided in the embodiments of the present invention, an out-of-service network element or a compensation network element of another network element or a network element that is performing an optimization operation is controlled, by determining whether the network element is out of service, or whether the network element is the compensation network element of another network element, or whether the network element is performing the optimization operation, not to enter an energy saving state, thereby solving the problem of prolonging the time for determining the out-of-service network element or increasing the probability of determining the out-of-service network element wrongly.

Embodiment 2

Figure 3:
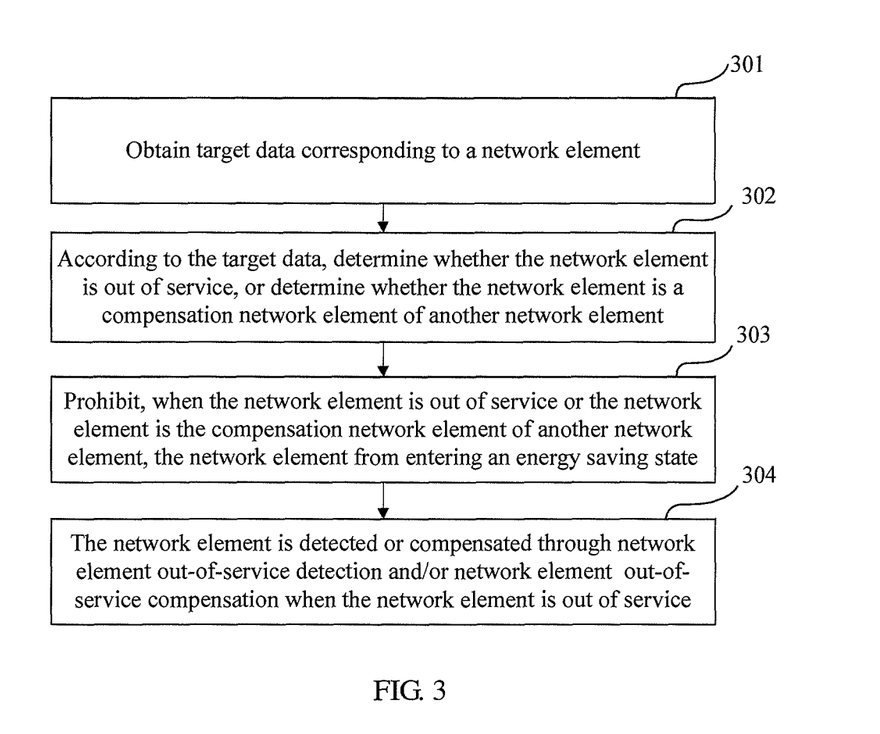
FIG. 3 is a flowchart of a method for processing a network element state according to Embodiment 2 of the present invention.

This embodiment provides a method for processing a network element state. As shown in FIG. 3, the method includes:

301: Obtain target data corresponding to a network element.

The network element may be a base station, a cell, or a subnet. The target data includes at least one of trace data, manual minimization of drive tests data, radio link failure data, handover failure data, a user equipment failure report, alarm data, and performance data.

Specifically, a tracking task or a minimization of drive tests task is started for the network element or a neighboring network element of the network element, where an executing range of the started tracking task or the minimization of drive tests task includes the network element or the neighboring network element of the network element; and the trace data or minimization of drive tests data corresponding to the network element is obtained after the tracking task or the minimization of drive tests task is finished.

Alternatively, existing data of the network element or a neighboring network element of the network element is obtained, and the target data is obtained according to the existing data. The existing data is stored on the network element or the neighboring network element, or on a network management entity or a trace data collecting entity.

Before step 301, the method further includes: obtaining the network element in step 301.

Specifically, key performance data of all network elements is obtained; and when all the network elements include a network element whose key performance data is less than a preset threshold, the network element whose key performance data is less than the preset threshold is obtained as the network element, where the key performance data includes at least one of a network element load, an access success rate, a handover success rate, and a network element or user throughput, and the preset threshold is an indicator value pre-assigned for the key performance data.

Alternatively, when all the network elements include a network element that initiates an energy saving request, the network element that initiates the energy saving request is obtained as the network element.

Alternatively, when all the network elements include a network element, whose key performance data includes at least one of a network element load, a network element access success rate, a network element handover success rate, and a network element or user throughput and whose load is less than a preset load value, the network element whose load is less than the preset load value is obtained as the network element.

302: According to the target data, determine whether the network element is out of service, or determine whether the network element is a compensation network element of another network element.

Specifically, when it is determined whether the network element is the compensation network element of another network element, it is determined, according to obtained state information that the network element is compensating another network element, or information that the network element is pre-configured to compensate another network element, or information that the network element is executing a parameter adjustment or operation, whether the network element is in a state of compensating another network element.

Alternatively, t is determined, according to an obtained compensation running state value of the network element, or obtained information that whether a neighboring cell of the network element is in a state of being compensated, or an obtained pre-configuration or a default running state for the network element, whether the network element is in a state of compensating another network element.

Alternatively, it is determined, when a load of the network element is less than a preset load value, or a quantity of accessing users is less than a preset quantity of accessing users, or a throughput of the network element is less than a preset network element throughput, or handover failure data is greater than a preset failure amount, or a poor radio environment of the network element is obtained from a user equipment failure report, or information that the network element malfunctions is obtained from alarm data, or a radio signal quality less than an expected value is obtained from manual minimization of drive tests data, or trace data includes information that a user signaling interface fails or cannot be executed, that the network element is out of service.

Further, when the target data is manual minimization of drive tests data, radio measurement data is obtained after the network element and an area in a preset range of the network element are measured; and it is determined, when an exception occurs in the radio measurement data of the network element in a preset time, that the network element is out of service.

Alternatively, it is determined when the target data is radio link failure data or handover failure data and when a user equipment that moves into the network element or moves into a neighboring network element of the network element reports the radio link failure data or handover failure data of the network element, that the network element is out of service.

303: Prohibit, when the network element is out of service or the network element is the compensation network element of another network element, the network element from entering an energy saving state.

Specifically, an energy saving allowing flag of the network element is set to indicate whether the network element can enter the energy saving state, where the energy saving allowing flag is allowing or prohibiting.

When the network element is preset with an energy saving allowing default value, the energy saving allowing flag of the network element is reset, at the moment that the network element returns to a normal state from the energy saving state or at a preset time point of resetting the flag, to be the energy saving allowing default value corresponding to the energy saving allowing flag, where the energy saving allowing default value may be allowing or prohibiting, and the energy saving allowing default value is an initial energy saving allowing flag of the network element.

Further, when the network element is used to compensate another network element, or is in a period of another optimization operation, and has executed a function of the compensation operation or the optimization operation, the network element is indicated, by setting the energy saving allowing flag of the network element to be prohibiting, that the network element is prohibited from entering the energy saving state. Further, when the network element is preset with an energy saving allowing default value, a changed energy saving allowing flag of the network element is reset, at the moment that the network element finishes the optimization operation, or finishes an operation of compensating another network element, to be the energy saving allowing default value. However, when the energy saving allowing default value of the network element is set to be prohibiting, the energy saving allowing flag of the network element cannot be changed during the operation.

304: The network element is detected and compensated through network element out-of-service detection and/or network element out-of-service compensation when the network element is out of service.

In this embodiment, when the network element needs to enter the energy saving state and it is checked that the energy saving allowing flag of the network element is prohibiting, the network element is firstly instructed to send an energy saving entering request and wait to receive information for determining whether the network element can enter the energy saving state, or the network element is instructed to finish the energy saving request to return to the normal state. When it is determined according to the target data of the network element that the network element is an out-of-service network element, or the network element is performing another operation, or the network element needs to compensate or is compensating another network element, or a default value of the network element is prohibiting the network element from entering the energy saving state, the network element is prohibited from entering the energy saving state or the energy saving entering request of the network element is refused, or the energy saving allowing flag of the network element is set to be prohibiting. When it is determined according to the target data that the network element is a normal network element, the network element is allowed to enter the energy saving state, or the energy saving allowing flag of the network element is set to be allowing. When the network element finishes energy saving, or when the network element returns to the normal state from an out-of-service state, or when the network element finishes compensation, or when the network element finishes performing another operation, the energy saving allowing flag of the network element is restored to be the default value, or the energy saving allowing flag is reset to be allowing.

Figure 4:
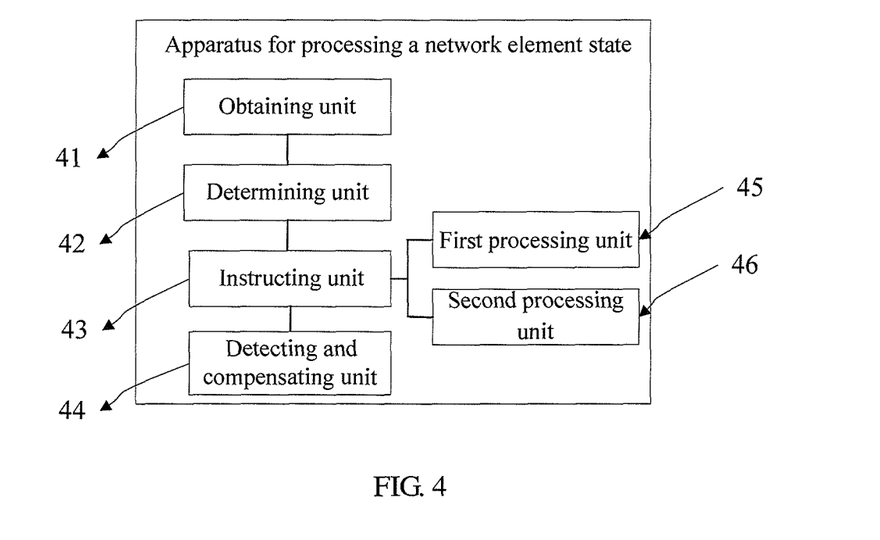
FIG. 4 is a schematic structural diagram of an apparatus for processing a network element state according to Embodiment 2 of the present invention.

This embodiment provides an apparatus for processing a network element state. As shown in FIG. 4, an entity of the apparatus may be a base station or a cell. The apparatus includes: an obtaining unit 41, a determining unit 42, an instructing unit 43, a detecting and compensating unit 44, a first processing unit 45, and a second processing unit 46.

The obtaining unit 41 is configured to obtain target data corresponding to a network element.

The network element may be a base station, a cell, or a subnet.

The obtaining unit 41 may be further configured to obtain the network element.

The obtaining unit 41 may be further configured to obtain key performance data of all network elements.

The obtaining unit 41 may be further configured to: when all the network elements include a network element whose key performance data is less than a preset threshold, obtain the network element whose key performance data is less than the preset threshold as the network element.

The key performance data includes at least one of a network element load, an access success rate, a handover success rate, and a network element or user throughput, and the preset threshold is an indicator value pre-assigned for the key performance data.

The obtaining unit 41 may be further configured to: when all the network elements include a network element that initiates an energy saving request, obtain the network element that initiates the energy saving request as the network element.

The obtaining unit 41 may be further configured to: when all the network elements include a network element whose key performance data includes at least one of a network element load, a network element access success rate, a network element handover success rate, and a network element or user throughput and whose load is less than a preset load value, obtain the network element whose load is less than the preset load value as the network element.

The obtaining unit 41 may be further configured to start a tracking task or start a minimization of drive tests task for the network element or a neighboring network element of the network element, where an executing range of the started tracking task or the minimization of drive tests task includes the network element or the neighboring network element of the network element.

The obtaining unit 41 may be further configured to obtain trace data or minimization of drive tests data corresponding to the network element after the tracking task or the minimization of drive tests task is finished.

The obtaining unit 41 may be further configured to obtain existing data of the network element or the neighboring network element of the network element, and obtain the target data according to the existing data.

The existing data is stored on the network element or the neighboring network element, or on a network management entity or a trace data collecting entity.

The determining unit 42 is configured to: according to the target data, determine whether the network element is out of service, or determine whether the network element is a compensation network element of another network element.

The determining unit 42 may be further configured to determine, according to obtained state information that the network element is compensating another network element, or information that the network element is pre-configured to compensate another network element, or information that the network element is executing a parameter adjustment or operation, whether the network element is in a state of compensating another network element.

The determining unit 42 may be further configured to determine, according to an obtained compensation running state value of the network element, or obtained information that whether a neighboring cell of the network element is in a state of being compensated, or an obtained pre-configuration or a default running state for the network element, whether the network element is in a state of compensating another network element.

The determining unit 42 may be further configured to: when a load of the network element is less than a preset load value, or a quantity of accessing users is less than a preset quantity of accessing users, or a throughput of the network element is less than a preset network element throughput, or handover failure data is greater than a preset failure amount, or a poor radio environment of the network element is obtained from a user equipment failure report, or information that the network element malfunctions is obtained from alarm data, or a radio signal quality less than an expected value is obtained from manual minimization of drive tests data, or trace data includes information that a user signaling interface fails or cannot be executed, determine that the network element is out of service.

The determining unit 42 may be further configured to obtain radio measurement data after the network element and an area in a preset range of the network element are measured.

The determining unit 42 may be further configured to determine, when an exception occurs in the radio measurement data of the network element in a preset time, that the network element is out of service.

The determining unit 42 may be further configured to determine, when a user equipment that moves into the network element or moves into a neighboring network element of the network element reports radio link failure data or handover failure data of the network element, that the network element is out of service.

The determining unit 42 may be further configured to: when it is determined according to the target data of the network element that the network element is a out-of-service network element, or the network element is performing another operation, or the network element needs to compensate or is compensating another network element, or a default value of the network element is prohibiting the network element from entering the energy saving state, prohibit the network element from entering an energy saving state or refuse an energy saving entering request of the network element.

The determining unit 42 may be further configured to: when it is determined according to the target data that the network element is a normal network element or the default value of the network element is not prohibiting the network element from entering the energy saving state, allow the network element to enter the energy saving state or set an energy saving allowing flag of the network element to be allowing.

The instructing unit 43 is configured to instruct, when the network element is out of service or the network element is the compensation network element of another network element, the network element not to enter the energy saving state.

The instructing unit 43 may be further configured to indicate, by setting an energy saving allowing flag of the network element, whether the network element can enter the energy saving state, where the energy saving allowing flag is allowing or prohibiting.

The instructing unit 43 may be further configured to: when the network element is used to compensate another network element, or is in a period of another optimization operation, and has executed a function of the compensation operation or the optimization operation, instruct the network element not to enter the energy saving state.

The instructing unit 43 may be further configured to instruct, when the network element needs to enter the energy saving state, the network element to send an energy saving entering request.

The detecting and compensating unit 44 is configured to detect and compensate the network element through network element out-of-service detection and/or network element out-of-service compensation when the network element is out of service.

The first processing unit 45 is configured to: when the network element is preset with an energy saving allowing default value, reset, at the moment that the network element returns to a noitual state from the energy saving state or at a preset time point of resetting the flag, the energy saving allowing flag of the network element to be the energy saving allowing default value corresponding to the energy saving allowing flag.

The energy saving allowing default value may be allowing or prohibiting, and the energy saving allowing default value is an initial energy saving allowing flag of the network element.

The second processing unit 46 is configured to: when the network element is preset with an energy saving allowing default value, reset, at the moment that the network element finishes the optimization operation, or finishes an operation of compensating another network element, the energy saving allowing flag of the network element to be the energy saving allowing default value.

The second processing unit 46 may be further configured not to reset the energy saving allowing flag of the network element when the energy saving allowing default value of the network element is set to be prohibiting.

The second processing unit 46 may be further configured to restore a preset default value of the network element when the network element finishes energy saving.

In the method and apparatus for processing a network element state that are provided in the embodiments of the present invention, the network element is obtained firstly. Then, the target data corresponding to the network element is obtained. According to the target data, it is determined whether the network element is out of service, or it is determined whether the network element is the compensation network element of another network element. Finally, when the network element is out of service, the network element is instructed not to enter the energy saving state. In the prior art, only a base station itself is considered when the network element state is determined, which causes a problem of prolonging time for determining the out-of-service network element or increasing a probability of determining the out-of-service network element wrongly. In the embodiments of the present invention, a working state of the network element is determined by collecting and analyzing the target data related to the network element, and subsequent coordination work is performed, thereby solving the problem of prolonging the time for determining the out-of-service network element or increasing the probability of determining the out-of-service network element.

The apparatus for processing a network element state that is provided in the embodiment of the present invention can implement the foregoing method embodiment, refer to the description in the method embodiment for specific functional implementation, and details will not be described herein again. The method and apparatus for processing a network element state that are provided in the embodiments of the present invention are applicable to the field of communications systems, but are not limited thereto.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), or a random access memory (RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing a network element state, the method comprising:
   obtaining key performance data of a respective network element of a plurality of network elements, wherein the key performance data comprises an access success rate or user throughput;
   determining a first network element from the plurality of network elements according to the key performance data of the respective network element and a load of the respective network element, wherein the key performance data of the first network element is less than a first threshold and a load of the first network element is less than a second threshold;
   obtaining a compensation running state value of the first network element, wherein the compensation running state value indicates whether the first network element is compensating a second network element from the plurality of network elements;
   determining, according to the compensation running state value, whether the first network element is in a state of compensating the second network element;
   prohibiting, when the first network element is in the state of compensating the second network element, the first network element from entering an energy saving state by prohibiting changing a default value of an energy saving flag of the first network element, wherein the default value indicates the first network element is prohibited from entering the energy saving state; and
   wherein the first network element is a first cell, and the second network element is a second cell neighboring the first cell.

2. The method according to claim 1, wherein the key performance data further comprises at least one of a handover success rate or a network element throughput, and the first threshold is an indicator value pre-assigned for the key performance data.

3. The method according to claim 1, wherein prohibiting the first network element from entering the energy saving state comprises:
   prohibiting the first network element from entering the energy saving state by setting the energy saving flag at a first value to indicate that the network element is prohibited from entering the energy saving state;
   wherein the method further comprises:
      resetting, when the first network element returns to a non ial state from the energy saving state, or when the first network element finishes an operation of compensating the second network element, or at a preset time point of resetting the energy saving flag, the energy saving flag at a second value, wherein the second value corresponds to an initial value preset for the first network element.

4. The method according to claim 1, further comprising:
   allowing, when the first network element is not in the state of compensating the second network element, the first network element to enter an energy saving state.

5. An apparatus for processing a network element state, the apparatus comprising a processor and a processing hardware platform executing instructions stored on a non-transitory computer-readable storage medium, which when executed cause the apparatus to:
   obtain key performance data of a respective network element of a plurality of network elements, wherein the key performance data comprises an access success rate or user throughput;
   determine a first network element from the plurality of network elements according to the key performance data of the respective network element and a load of the respective network element, wherein the key performance data of the first network element is less than a first threshold and a load of the first network element is less than a second threshold;
   obtain a compensation running state value of the first network element, wherein the compensation running state value indicates whether the first network element is compensating a second network element from the plurality of network elements;
   determine, according to the compensation running state value, whether the first network element is in a state of compensating the second network element;
   prohibit, when the first network element is in the state of compensating the second network element, the first network element from entering an energy saving state by prohibiting changing a default value of an energy saving flag of the first network element, wherein the default value indicates the first network element is prohibited from entering the energy saving state; and
   wherein the first network element is a first cell, and the second network element is a second cell neighboring the first cell.

6. The apparatus according to claim 5, wherein the key performance data further comprises at least one of a handover success rate or a network element throughput, and the first threshold is an indicator value pre-assigned for the key performance data.

7. The apparatus according to claim 5, wherein the instructions further cause the apparatus to:
   prohibit the first network element from entering the energy saving state by setting the energy saving flag at a first value to indicate that the network element is prohibited from entering the energy saving state; and
   reset, when the first network element returns to a normal state from the energy saving state, or when the first network element finishes an operation of compensating the second network element, or at a preset time point of resetting the energy saving flag, the energy saving flag at a second value, wherein the second value corresponds to an initial value preset for the first network element.

8. The apparatus according to claim 5, wherein the instructions further cause the apparatus to:
   allow, when the first network element is not in the state of compensating the second network element, the first network element to enter an energy saving state.

9. A non-transitory computer-readable medium storing computer instructions for execution by one or more processors, wherein the computer instructions instruct the one or more processors to:
   obtain key performance data of a respective network element of a plurality of network elements, wherein the key performance data comprises an access success rate or user throughput;
   determine a first network element from the plurality of network elements according to the key performance data of the respective network element and a load of the respective network element, wherein the key performance data of the first network element is less than a first threshold and a load of the first network element is less than a second threshold;

obtain a compensation running state value of the first network element, wherein the compensation running state value indicates whether the first network element is compensating a second network element from the plurality of network elements;

determine, according to the compensation running state value, whether the first network element is in a state of compensating the second network element;

prohibit, when the first network element is in the state of compensating the second network element, the first network element from entering an energy saving state by prohibiting changing a default value of an energy saving flag of the first network element, wherein the default value indicates the first network element is prohibited from entering the energy saving state; and wherein the first network element is a first cell, and the second network element is a second cell neighboring the first cell.

10. The non-transitory computer-readable medium according to claim 9, wherein the key performance data further comprises at least one of a handover success rate or a network element throughput, and a user throughput, and the first threshold is an indicator value pre-assigned for the key performance data.

11. The non-transitory computer-readable medium according to claim 9, wherein the computer instructions further instruct the one or more processors to:

prohibit the first network element from entering the energy saving state by setting the energy saving flag at a first value to indicate that the network element is prohibited from entering the energy saving state; and reset, when the first network element returns to a normal state from the energy saving state, or when the first network element finishes an operation of compensating the second network element, or at a preset time point of resetting the energy saving flag, the energy saving flag at a second value, wherein the second value corresponds to an initial value preset for the first network element.

12. The non-transitory computer-readable medium according to claim 9, wherein the computer instructions further instruct the one or more processors to:

allow, when the first network element is not in the state of compensating the second network element, the first network element to enter an energy saving state.

* * * * *

UNITED STATES PATENT AND TRADEMARK OFFICE
CERTIFICATE OF CORRECTION

PATENT NO. : 10,432,488 B2  
APPLICATION NO. : 14/335297  
DATED : October 1, 2019  
INVENTOR(S) : Dong Zhao Page 1 of 1

It is certified that error appears in the above-identified patent and that said Letters Patent is hereby corrected as shown below:

In the Claims

In Column 11, Line 52, Claim 3, delete "non ial state" and insert --normal state--.

In Column 14, Line 1, Claim 10, delete "and a user throughput,".

Signed and Sealed this
Twelfth Day of November, 2019

Andrei Iancu
*Director of the United States Patent and Trademark Office*